UNITED STATES PATENT OFFICE.

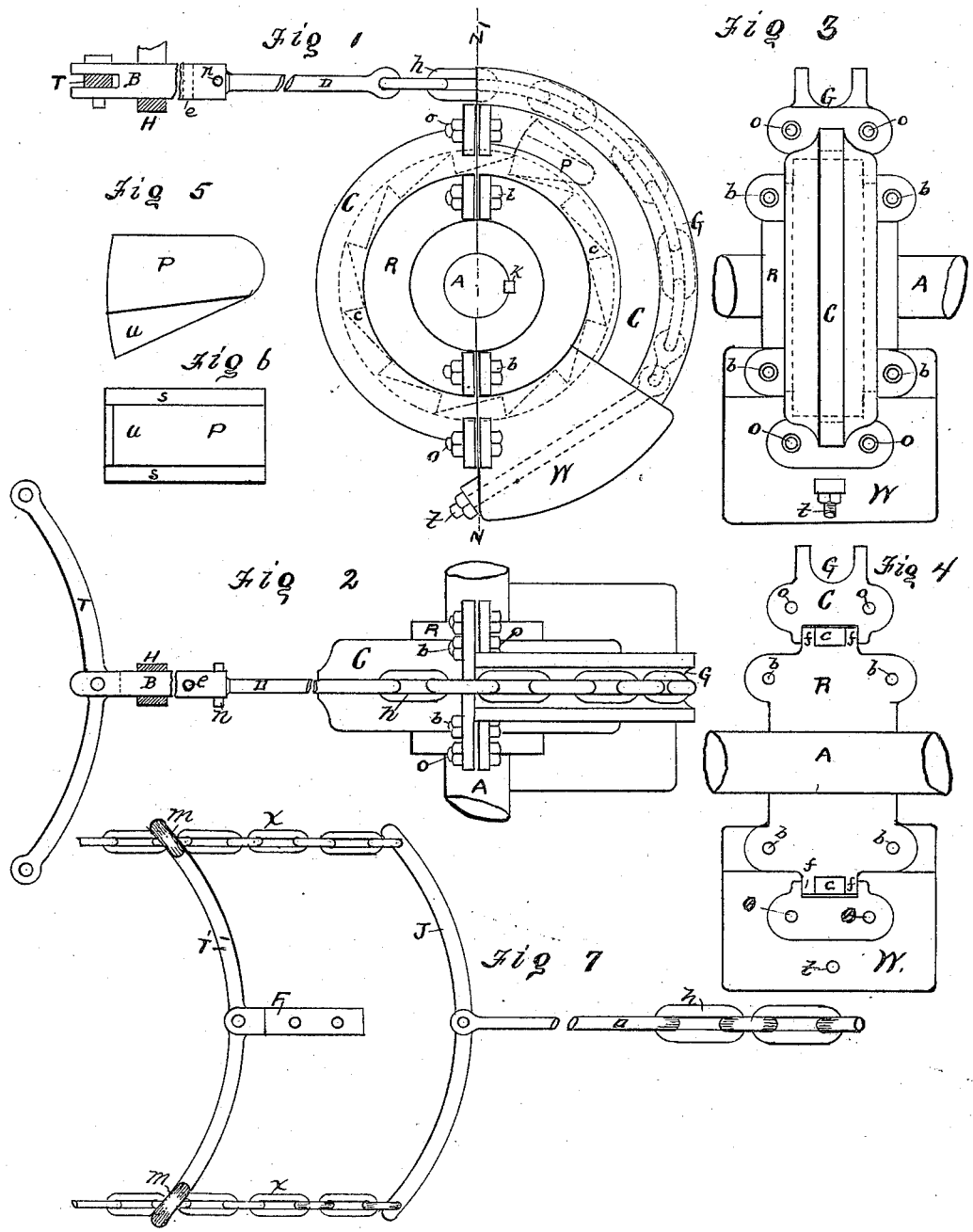

CHARLES B. BROADWELL, OF NEW ORLEANS, LOUISIANA.

CAR-STARTER.

SPECIFICATION forming part of Letters Patent No. 310,556, dated January 13, 1885.

Application filed May 22, 1884. (No model.)

*To all whom it may concern:*

Be it known that I, CHARLES B. BROADWELL, a citizen of the United States, residing in the city of New Orleans, parish of Orleans, State of Louisiana, have invented a new and useful Car-Starter, of which the following is a specification.

My invention relates to improvements in car-starters in which a ratchet-wheel is secured to the forward axle of a car, and works in conjunction with a counterweighted annular wheel and pawl; and the objects of my invention are, first, to provide a means by which the car can be easily started, thus saving the straining and tugging, and consequent wear and tear, of the animal pulling the car; second, to afford facilities by which the car may be moved backward when the machine is attached to it; third, to provide a means by which the working parts are protected and kept from being injured by dust and dirt. I attain these objects by the mechanism illustrated in the accompanying drawings, in which—

Figure 1 is a side view of the machine. Fig. 2 is a plan view looking from top. Fig. 3 is a view looking from the front. Fig. 4 is a section taken on plane N N, Fig. 1. Figs. 5 and 6 are enlarged views of the pawl. Fig. 7 is a view showing another method of attaching the machine to the cross-tree to which the animal is attached.

Similar letters refer to similar parts throughout the several views.

To the axle A of the car is secured the ratchet-wheel R by the key K, this ratchet-wheel R being made in two parts and secured together by the bolts $b\ b'$. The cogs $c$ are made in the center of the periphery of wheel, leaving a shoulder or flange, $f$, on each side of cogs $c$. Over this ratchet-wheel R, and revolving on the flange $f$, is fitted a counterbalanced annular wheel, C. This annular wheel C is made in two pieces and secured together by the bolts $o\ o$. The object of making these wheels in two pieces is to enable the machine to be attached without removing the wheels of car. One-half of this annular wheel C is provided with a counterbalance-weight, W, and groove G, for receiving the chain $h$. This chain $h$ is secured to the periphery of the annular wheel C by the bolt $t$, passing through the counter-weight W'. On the inside of the annular wheel C is placed a pawl, P. This pawl P is provided with a tongue, $u$, which fits into cogs $c$, and the shoulders $s\ s$ rest on flange $f$ of ratchet-wheel R. This pawl P is placed in the pocket made for it in the annular wheel C, and automatically puts the machine in and out of gear. The machine is placed on the axle A of the car, so that when the car is standing the counter-weight W pulls the annular wheel over, and the pawl P, of its own gravity, falls into gear. When the car is started, the annular wheel C, carrying the pawl P, revolves, and at the proper point the pawl P falls out of gear by its own gravity.

To the chain $h$ is attached the rod D, which is attached to the draw-bar B, carrying the cross-tree T, and which moves in the guide H, placed at front end of car. The bar B is provided with the pin $n$ and hole $e$, the operation being that when the car is started the animal pulls, by the cross-tree T, rod D, and chain $h$, the annular wheel C, and by means of the pawl P revolves the axle A of car, and at the proper point the pin $n$ comes in contact with the guide H and the pawl P drops out of gear, and the car is drawn by the pin $n$ against the guide H, the object of the hole $e$ being to admit of a pin being placed in same, in front of guide H, to keep the counter-weight W from pulling annular wheel over and putting pawl P into gear, by which means the car can be run backward.

Instead of the above-described attachment for connecting the machine with cross-tree, I use the plan shown in Fig. 7, in which the cross-tree T' is attached to the stationary draw-head F, secured to front end of car, the ends of cross-tree T' having holes $m\ m$, through which the chain traces $x$ pass, and are secured to the cross-tree J, to which is attached the rod D, connected by chain $h$ with the annular wheel C, the distance between the cross-tree T' and cross-tree J being sufficient to start the car and pull the annular wheel C over till pawl P drops out of gear, when the car is drawn by the cross-tree J, resting against cross-tree T'.

What I claim as new, and desire to secure by Letters Patent, is—

In a car-starter, the combination of the ratchet-wheel R, provided with the sunken cogs $c$ and flanges $f$, with the counterweighted annular wheel C, and the pawl P, provided with tongue $u$ and shoulder $s$, all substantially as set forth, for the purpose specified.

CHAS. B. BROADWELL.

Witnesses:
JULES GAPERIE,
J. F. COFFEY.